United States Patent
Triplett

(10) Patent No.: US 6,529,781 B1
(45) Date of Patent: Mar. 4, 2003

(54) METHOD AND APPARATUS FOR IDENTIFYING AND DISPLAYING PROCESS INTERACTIONS

(76) Inventor: Timothy L. Triplett, 2440 Texas Pkwy., Suite 101, Missouri City, TX (US) 77489

( * ) Notice: Subject to any disclaimer, the term of this patent is extended or adjusted under 35 U.S.C. 154(b) by 0 days.

(21) Appl. No.: 09/273,026

(22) Filed: Mar. 19, 1999

Related U.S. Application Data

(60) Provisional application No. 60/078,646, filed on Mar. 19, 1998.

(51) Int. Cl.[7] .............................. G05B 11/01; G06F 9/44

(52) U.S. Cl. .............................. 700/18; 700/26; 717/125

(58) Field of Search .............................. 700/18, 23, 26, 700/47, 86, 87; 702/119, 120, 183; 717/124, 125, 131

(56) References Cited

U.S. PATENT DOCUMENTS

| | | | | |
|---|---|---|---|---|
| 4,994,957 A | * | 2/1991 | Komiya et al. | 364/147 |
| 5,687,074 A | * | 11/1997 | Tanaka et al. | 364/140 |
| 5,777,869 A | * | 7/1998 | Welch | 364/147 |
| 5,784,621 A | * | 7/1998 | Onishi et al. | 395/702 |
| 5,812,133 A | * | 9/1998 | Schultz et al. | 345/809 |
| 6,128,773 A | * | 10/2000 | Snider | 702/182 |

* cited by examiner

Primary Examiner—Leo Picard
Assistant Examiner—Elliot Frank
(74) Attorney, Agent, or Firm—Jackson Walker L.L.P.

(57) ABSTRACT

A method and apparatus for identifying and displaying process interactions. Process data points are identified and inputted into a computer along with a logic network relating to these points. A computer program operates through the logic network to analyze the interactions of the points. A tabulation of the interactions found is created in the program and stored as a database. Upon query regarding a particular data point, the tabulation is presented in a readable format on a screen of said computer.

5 Claims, 17 Drawing Sheets

[ START OF LD PROGRAM SEC8002 ]

[ VARIABLE DECLARATIONS ]

VARIABLE DECLARATION TABLE

| REFERENCE | NICKNAME | REFERENCE DESCRIPTION |
|---|---|---|
| %I0001 | HP | HIGH PRESS PUMP RUNNING |
| %I0002 | CFPON | CLEAN FLUSH PUMP ON |
| %I0003 | ISVON | INLET SOL VALVE ON |
| %I0004 | CHPMP | CHEM PUMP ON |
| %I0005 | CTMXR | CHEM TANK MIXER ON |
| %I0006 | RES | RESET |
| %I0007 | ACK | ACKNOW-LEDGE |
| %I0008 | LT | LAMP TEST |
| %I0009 | | |
| %I0010 | FPLOW | FEED PRESS LOW |
| %I0011 | HPSD | HIGH PRESS SHUTDWN |
| %I0012 | CHTLL | CHEM TANK LOW LEVEL |
| %I0013 | LOPMT | LOSS OF PHASE/MOT STR TRIPO |
| %I0014 | HICON | HIGH CONDUC-TIVITY |
| %I0015 | | |
| %Q0001 | LTOUT | LAMP TEST OUTPUT |
| %Q0002 | HPOUT | HIGH PRESS PUMP OUTLET |
| %Q0003 | CFOUT | CLEAN/FLUSH PUMP OUTPUT |
| %Q0004 | IVOUT | INLET SOL VALVE OUTPUT |
| %Q0005 | CPOUT | CHEM PUMP OUTPUT |
| %Q0006 | CTOUT | CHEM TANK MIXER OUTPUT |
| %Q0007 | LFP_L | LOW FEED PRESS LAMP |
| %Q0008 | HPSD_L | HIGH PRESS SHUTDWN LAMP |
| %Q0009 | LCHT_L | LO LEV CHEM TANK LAMP |
| %Q0010 | MST_L | MS TRIP LOSS OF PHASE LAMP |
| %Q0011 | HC_L | HIGH CONDUC-TIVITY LAMP |
| %Q0012 | ALRLY | ALARM RELAY |
| %M0001 | LFPL | LOW FEED PRESS LATCH |
| %M0002 | HPSDL | HIGH PRESS SHUTDWN LATCH |
| %M0003 | LCHTL | LOW CHEM TANK LATCH |
| %M0004 | LPMTL | MOTOR ST TRIP LOSS PH LATCH |
| %M0005 | HICL | HIGH CONDUC-TIVITY LATCH |
| %M0006 | FB | FLASH BIT |
| %M0007 | | |

Fig. 1
(PRIOR ART)

IDENTIFIER TABLE

| IDENTIFIER | IDENTIFIER TYPE | IDENTIFIER DESCRIPTION |
|---|---|---|
| SEC8002 | PROGRAM NAME | |

[ BLOCK DECLARATIONS ]

[ START OF PROGRAM LOGIC ]

```
(****************************************************************)
(* SPECIFIC EQUIPMENT COMPANY                                   *)
(* REVERSE OSMOSIS CONTROL SYSTEM                               *)
(* PLC PROGRAM                                                  *)
(*                                                              *)
(* WRITTEN BY:                                                  *)
(* BriTech INFORMATION RESOURCES                                *)
(* 2048 OLD DIXIE DRIVE                                         *)
(* RICHMOND, TEXAS 77469-6811                                   *)
(* (281) 342-1590                                               *)
(* (281) 342-0940  (FAX)                                        *)
(* (713) 705-4801  (PAGER)                                      *)
(* BriTech@compuserve.com   (E-MAIL)                            *)
(*                                                              *)
(* BriTech JOB NO. 8002                                         *)
(* WRITTEN  17JAN 1998                                          *)
(*                                                              *)
(****************************************************************)
(****************************************************************)
(* HIGH PRESSURE PUMP LOGIC                                     *)
(****************************************************************)
```

<< RUNG 6   STEP #0003 >>

| HIGH PRESS PUMP RUNNING %I0001 | LOW FEED PRESS LATCH %M0001 | MOTOR ST TRIP LOSS PH LATCH %M0004 | HIGH CONDUC- TIVITY LATCH %M0005 | CLEAN/ FLUSH PUMP OUTPUT %Q0003 | HIGH PRESS SHUTDWN LATCH %M0002 | INLET SOL VALVE OUTPUT %Q0004 | HIGH PRESS PUMP OUTLET %Q0002 |
|---|---|---|---|---|---|---|---|
| ─┤ ├─ | ─┤/├─ | ─┤/├─ | ─┤/├─ | ─┤/├─ | ─┤/├─ | ─┤ ├─ | ─( )─ |

```
(****************************************************************)
(* CLEAN/FLUSH PUMP LOGIC.                                      *)
(****************************************************************)
```

<< RUNG 8   STEP #0012 >>

| CLEAN | MOTOR | HIGH | | CLEAN/ |
|---|---|---|---|---|
| FLUSH | ST TRIP | PRESS | | FLUSH |
| PUMP | LOSS PH | PUMP | | PUMP |
| ON | LATCH | OUTPUT | | OUTPUT |
| %I0002 | %M0004 | %Q0002 | | %Q0003 |
| ─┤ ├─ | ─┤ / ├─ | ─┤ / ├─ | | ─( )─ |

(*************************************************************)
(* INLET SOLENOID VALVE LOGIC.                              *)
(*************************************************************)

<< RUNG 10   STEP #0017 >>

| INLET | LOW | MOTOR | HIGH | INLET |
|---|---|---|---|---|
| SOL | FEED | ST TRIP | CONDUC- | SOL |
| VALVE | PRESS | LOSS PH | TIVITY | VALVE |
| ON | LATCH | LATCH | LATCH | OUTPUT |
| %I0003 | %M0001 | %M0004 | %M0005 | %Q0004 |
| ─┤ ├─ | ─┤ / ├─ | ─┤ / ├─ | ─┤ / ├─ | ─( )─ |

(*************************************************************)
116 (* CHEMICAL PUMP OUTPUT LOGIC.                         *)
(*************************************************************)

<< RUNG 12   STEP #0023 >>                              118

| | LOW | | | |
|---|---|---|---|---|
| CHEM | CHEM | | | CHEM |
| PUMP | TANK | | | PUMP |
| ON | LATCH | | | OUTPUT |
| %I0004 | %M0003 | | | %Q0005 |
| ─┤ ├─ | ─┤ / ├─ | | | ─( )─ |

(*************************************************************)
(* CHEMICAL MIXER OUTPUT LOGIC                              *)
(*************************************************************)

<< RUNG 14   STEP #0027 >>

| CHEM | | | | CHEM |
|---|---|---|---|---|
| TANK | | | | TANK |
| MIXER | | | | MIXER |
| ON | | | | OUTPUT |
| %I0005 | | | | %Q0006 |
| ─┤ ├─ | | | | ─( )─ |

Fig. 2A.2
(PRIOR ART)

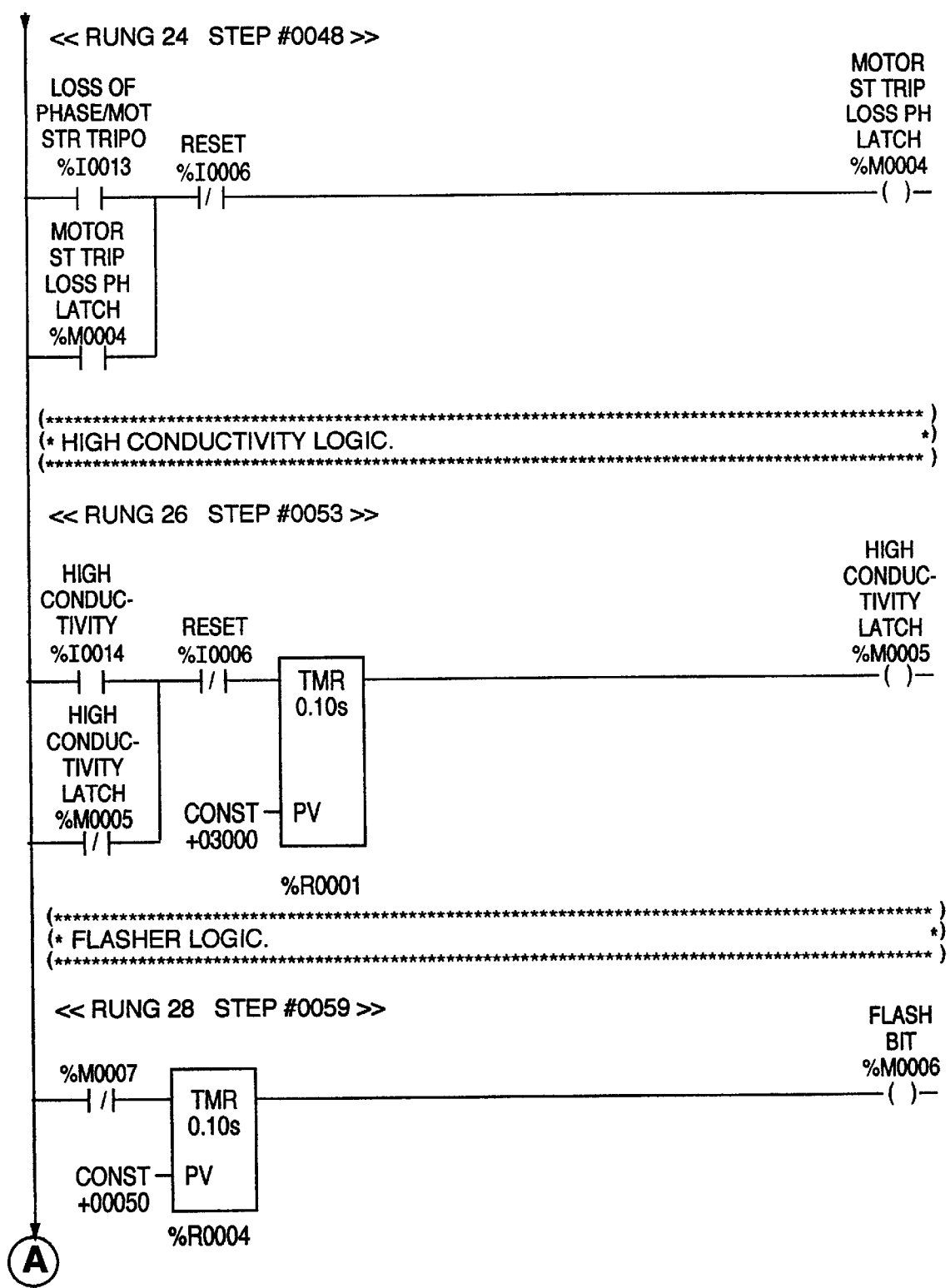
Fig. 2C.1
(PRIOR ART)

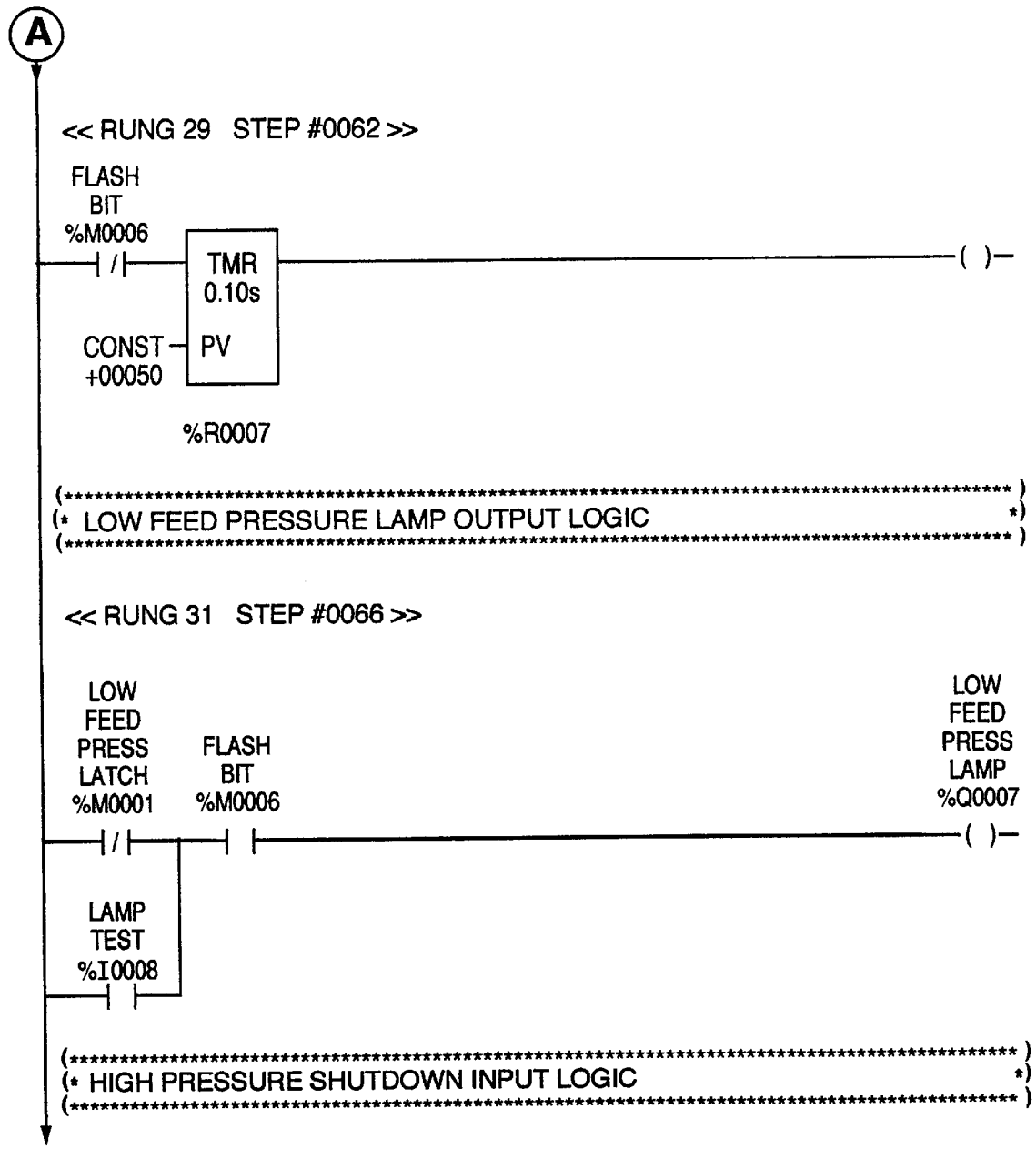
Fig. 2C.2
(PRIOR ART)

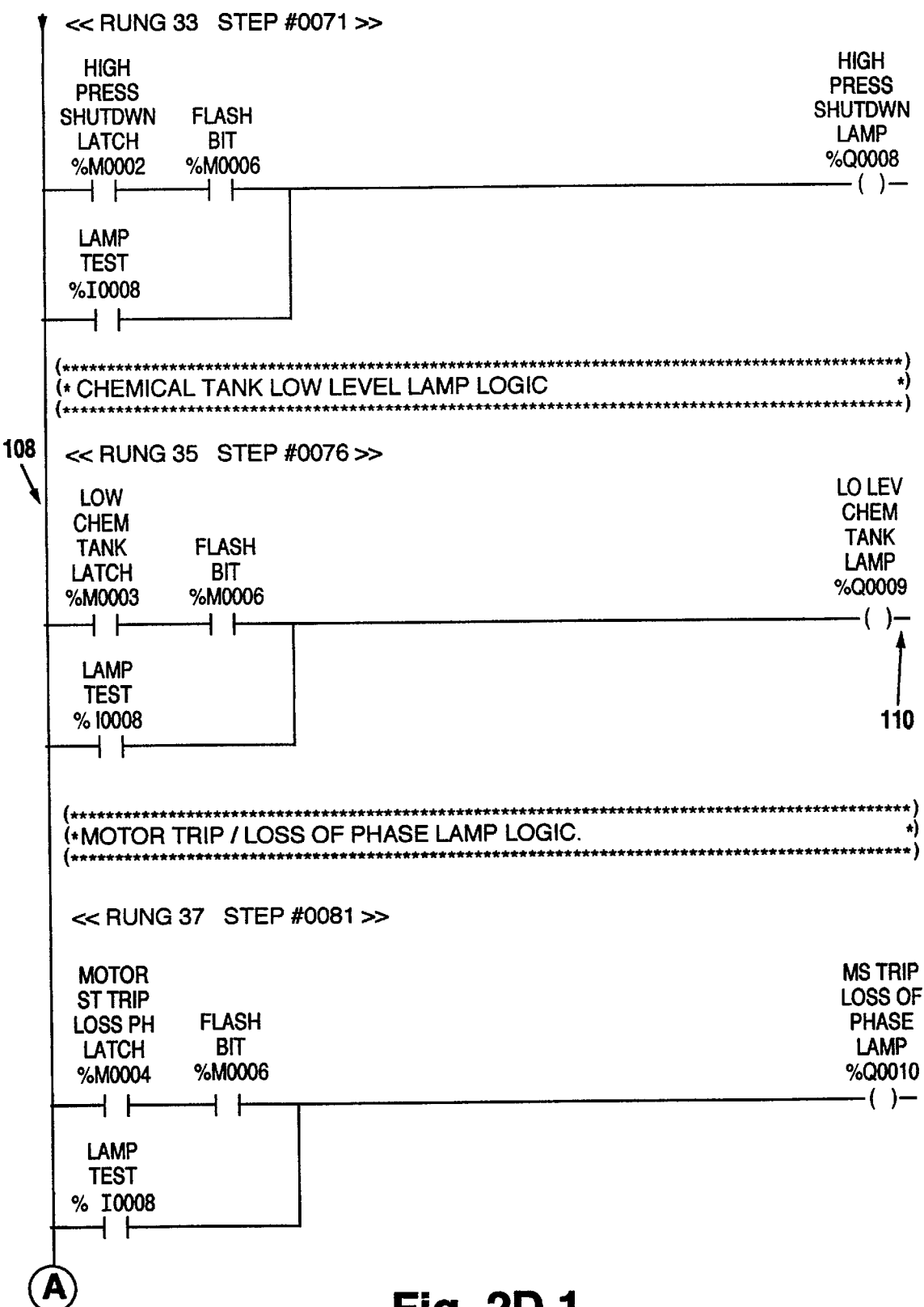
Fig. 2D.1
(PRIOR ART)

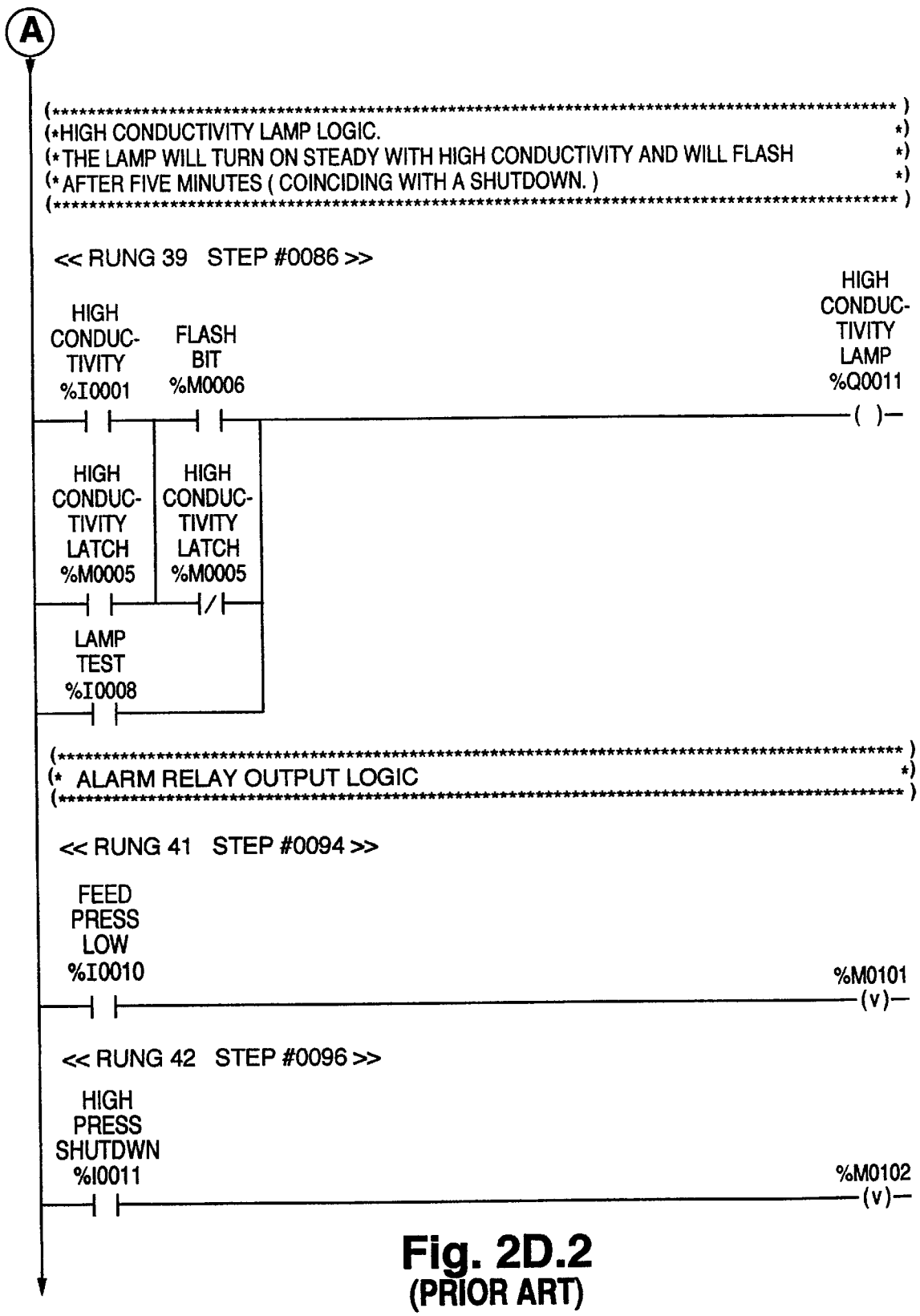
Fig. 2D.2
(PRIOR ART)

| REF.    | BLOCK | NICKNAME | REF. DESCRIPTION / CROSS REFERENCE |
|---------|-------|----------|------------------------------------|
| %I0001  | _MAIN | HP       | HIGH PRESS PUMP RUNNING<br>-] [- 6 |
| %I0002  | _MAIN | CFPON    | CLEAN FLUSH PUMP ON<br>-] [- 8 |
| %I0003  | _MAIN | ISVON    | INLET SOL VALVE ON<br>-] [- 10 |
| %I0004  | _MAIN | CHPMP    | CHEM PUMP ON<br>-] [- 12 |
| %I0005  | _MAIN | CTMXR    | CHEM TANK MIXER ON<br>-] [- 14 |
| %I0006  | _MAIN | RES      | RESET<br>-] [- 47<br>-] / [- 18,20,22,24,26 |
| %I0007  | _MAIN | ACK      | ACKNOW- LEDGE<br>-] [- 47 |
| %I0008  | _MAIN | LT       | LAMP TEST<br>-] [- 16,31,33,35,37,39 |
| %I0010  | _MAIN | FPLOW    | FEED PRESS LOW<br>-] [- 41<br>-] / [- 18 |
| %I0011  | _MAIN | HPSD     | HIGH PRESS SHUTDWN<br>-] [- 42<br>-] / [- 20 |
| %I0012  | _MAIN | CHTLL    | CHEM TANK LOW LEVEL<br>-] [- 22,43 |
| %I0013  | _MAIN | LOPMT    | LOSS OF PHASE/ MOT STR TRIPO<br>-] [- 24,44 |
| %I0014  | _MAIN | HICON    | HIGH CONDUC- TIVITY<br>-] [ 26,39 |

```
=======================================================================
============  OUTPUT  ( %Q )   GLOBAL CROSS REFERENCES
=======================================================================
    REF.      BLOCK     NICKNAME    REF. DESCRIPTION / CROSS REFERENCE
    ------    -------   ---------   ----------------------------------

%Q0001    _MAIN     LTOUT       LAMP TEST OUTPUT
                                    -( ) 16

%Q0002    _MAIN     HPOUT       HIGH PRESS PUMP OUTPUT
                                    -] [- 8
                                    -( ) 6

%Q0003    _MAIN     CFOUT       CLEAN/ FLUSH PUMP OUTPUT
                                    -] [- 6
                                    -( ) 8

%Q0004    _MAIN     IVOUT       INLET SOL VALVE OUTPUT

%Q0005    _MAIN     CPOUT       CHEM PUMP OUTPUT
                                    -( )- 12

%Q0006    _MAIN     CTOUT       CHEM TANK MIXER OUTPUT
                                    -( ) 14

%Q0007    _MAIN     LFP_L       LOW FEED PRESS LAMP
                                    -( ) 31

%Q0008    _MAIN     HPSD_L      HIGH PRESS SHUTDWN LAMP
                                    -( ) 33

%Q0009    _MAIN     LCHT_L      LO LEV CHEM TANK LAMP
                                    -( ) 35

%Q0010    _MAIN     MST_L       MS TRIP LOSS OF PHASE LAMP
                                    -( ) 37

%Q0011    _MAIN     HC_L        HIGH CONDUC- TIVITY LAMP
                                    -( ) 39

%Q0012    _MAIN     ALRLY       ALARM READY
                                    -(SM) 46
                                    -(RM) 47
```

Fig. 3B
(PRIOR ART)

```
=====================================================================
=========== INTERNAL ( %M ) GLOBAL CROSS REFERENCES
=====================================================================
   REF.      BLOCK    NICKNAME    REF. DESCRIPTION / CROSS REFERENCES
   -----     -----    --------    -----------------------------------
   %M0001    _MAIN     LFPL       LOW FEED PRESS LATCH
                                  -]  [- 18,31
                                  -]  [- 6,10
                                  -( ) 18
   %M0002    _MAIN     HPSDL      HIGH PRESS SHUTDWN LATCH
                                  -]  [- 20,33
                                  -]  [- 6
                                  -( ) 20
   %M0003    _MAIN     LCHTL      LOW CHEM TANK LATCH
                                  -]  [- 22,35
                                  -]  [- 12            ← 106
                                  -( ) 22
   %M0004    _MAIN     LPMTL      MOTOR ST TRIP LOSS PH LATCH
                                  -]  [- 24,37
                                  -]  [- 6,8,10
                                  -( ) 24
   %M0005    _MAIN     HICL       HIGH CONDUC- TIVITY LATCH
                                  -]  [- 26,39 45
                                  -]  [- 6,10,39
                                  -( ) 26
   %M0006    _MAIN     FB         FLASH BIT
                                  -]  [- 29,31,33,35,37,39
                                  -( ) 28
   %M0007    _MAIN                -]  [- 28
                                  -( ) 29
   %M0101    _MAIN                -]  [- 46
                                  -( v ) 41
   %M0102    _MAIN                -]  [- 46
                                  -( v ) 42
   %M0103    _MAIN                -]  [- 46
                                  -( ^ ) 43
   %M0104    _MAIN                -]  [- 46
                                  -( ^ ) 44
   %M0105    _MAIN                -]  [- 46
                                  -( ^ ) 45

=====================================================================
============ REGISTER ( %R ) GLOBAL CROSS REFERENCES
=====================================================================
   REF.      BLOCK    NICKNAME    REF. DESCRIPTION / CROSS REFERENCES
   %R0001    _MAIN                FBIO 26
   %R0004    _MAIN                FBIO 28
   %R0007    _MAIN                FBIO 29
```

104 points to %M0002 row. 106 points to -] [- 12 line.

Fig. 3C
(PRIOR ART)

| INTERACTIONS TABLE | | |
|---|---|---|
| SOURCE | DESTINATION | TYPE |
| %I0012 | %M0003 | STANDARD |
| %M0003 | %Q0009 | STANDARD |
| %M0003 | %Q0005 | STANDARD |
| %M0006 | %Q0009 | STANDARD |
| %M0007 | %M0006 | STANDARD |
| %I0008 | %Q0009 | STANDARD |
| %R0007 | %M0007 | STANDARD |
| %R0004 | %M0006 | STANDARD |
| 0.1 | %R0004 | TIMER TIMEBASE |
| 0.0050 | %R0004 | TIMER PV |
| 0.1 | %R0007 | TIMER TIMEBASE |
| 0.0050 | %R0007 | TIMER PV |

Fig. 4

Capture Object Definition to an object definition table.
This may be done manually, automatically, or a combination of the two. In the present invention, this is done automatically by importing files which contain the configuration information (object definitions and descriptions from Fig. 1 into the computer database).

Capture Object Interactions to an object interaction table.
This may be done manually, automatically, or a combination of the two. In the present invention, this is done automatically by importing files which contain the program logic into the computer database. Each rung of logic contains a number of objects on the left (contacts) which influence the state of a single object on the right (a coil) from Figs. 2A-2E.

User selects an object and requests information by making a query to the database.
Either what can influence the state of this object, or what can be influenced by this object, or both.

Assuming looking for other objects that this object can influence.
Program of the present invention will search Object Interactions table in the database for other objects that this object can influence directly. Assuming there are one or more such objects found, the Object Interactions table is again searched for other objects that they in turn can influence. This is repeated until either all objects which can be influenced (directly or indirectly) are found, or a maximum number of objects is found (if a limit has been given to avoid excessively large results.)

Assuming looking for other objects that can influence this object.
Program of the present invention will similarly search the Object Interactions table in the database for other objects that can directly or indirectly influence this object.

The Results are presented to the user as an interaction tree or a single visual screen display.
The screen display shows the objects which can influence (or be influenced) in a structured format for the user. This information can help the user identify root causes of an object's erroneous behavior, and/or understand possible results of changes to an object. Both can result in significant savings in technical man-hours, and system performance (e.g., process plant production rates and quality).

Fig. 5

METHOD AND APPARATUS FOR IDENTIFYING AND DISPLAYING PROCESS INTERACTIONS

This application claims priority to provisional application Ser. No. 60/078,646, filed Mar. 19, 1998.

BACKGROUND OF THE INVENTION

Control systems have input signals (input points or input objects), output signals (output points or output objects), internal values (internal points), and logic. Typically, the inputs are read, logic is performed, internal values (which may be intermediate results—results that are not of value themselves, but are used in subsequent logic—or final results—results that are the end produce of the logic) are updated, and outputs are generated.

For safe operation and maintenance of the control systems, the user must at times determine what effect or interactions there would be from changes to a point or object (i.e., determine what can be influenced by changes to some parameter of a particular point). Similarly, the user must at times determine what could be influencing a parameter of a particular point. An example of "a parameter of a particular point" would be the current value in gallons per minute of the inlet flow to tank number 1.

When a measurement instrument is to be serviced, its signal will change (often dramatically). This change may cause the control system to take unexpected actions based upon either straightforward or convoluted linkages within the control logic. The potential effect must be determined prior to working on the instrument, so that preparations can be made to avoid any problems with the process. If the value of an internal or output point is not as expected, the cause must be determined in order to evaluate whether this is an error or correct.

Determining how these various points or objects (input, output and internal) are related is traditionally done by hand, with the use of simple cross-references and listings of the logic. An example would be the cross-references provided by the documentation packages provided with most PLC's (programmable logic controllers) and their ladder logic listings.

When looking for what can influence a particular point, the engineer first looks it up in the cross-reference to see where the point is used. Then, looking at that particular referenced portion of logic, he determines what other points could affect this point. Next, these points must in turn be looked up to see what could affect them, and so on until all points that could affect this point are found.

Similarly, to determine what a particular point can influence, the engineer first looks it up in the cross-reference to see where the point is used. Then, looking at that particular referenced portion of logic, he determines what other points could be affected by this point. Next, these points must in turn be looked up to see what they could affect, and so on until all points that could be affected are found. This is a time consuming and tedious method. Further, it is easy to make a mistake and miss an affected point. The present invention provides a rapid, accurate method to visualize and represent these process insertions.

BRIEF SUMMARY OF THE INVENTION

The present invention is a method and apparatus for identifying and displaying process interactions. Process data points are identified and inputted into a computer along with a logic network relating to these points. A computer program operates through the logic network to analyze the interactions of the points. A tabulation of the interactions found is created in the program and stored as a database. Upon query regarding a particular data point, the tabulation is presented in a readable format on a screen of said computer.

BRIEF DESCRIPTION OF THE DRAWINGS

FIG. 1 illustrates a prior art listing of variable declarations, including service descriptions and nicknames.

FIGS. 2A–2E illustrate a prior art ladder logic diagram.

FIG. 3 shows a cross-reference table of the prior art.

FIG. 4 illustrates an interactions table generated by the method and apparatus of the present invention.

FIG. 5 is a block diagram illustrating the method of the present invention.

DETAILED DESCRIPTION OF THE PREFERRED EMBODIMENT

Figure 2B:
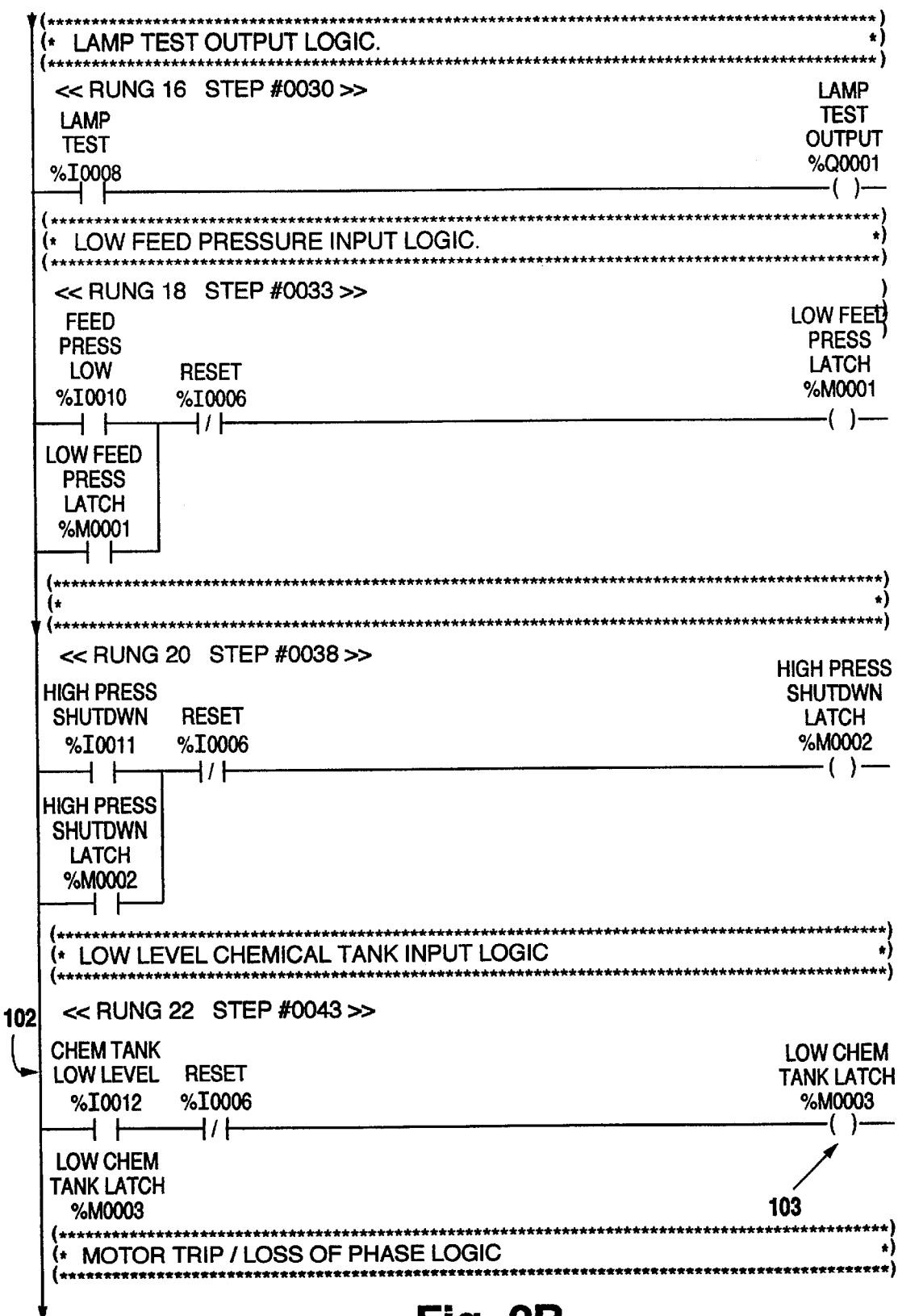
Figure 2E:
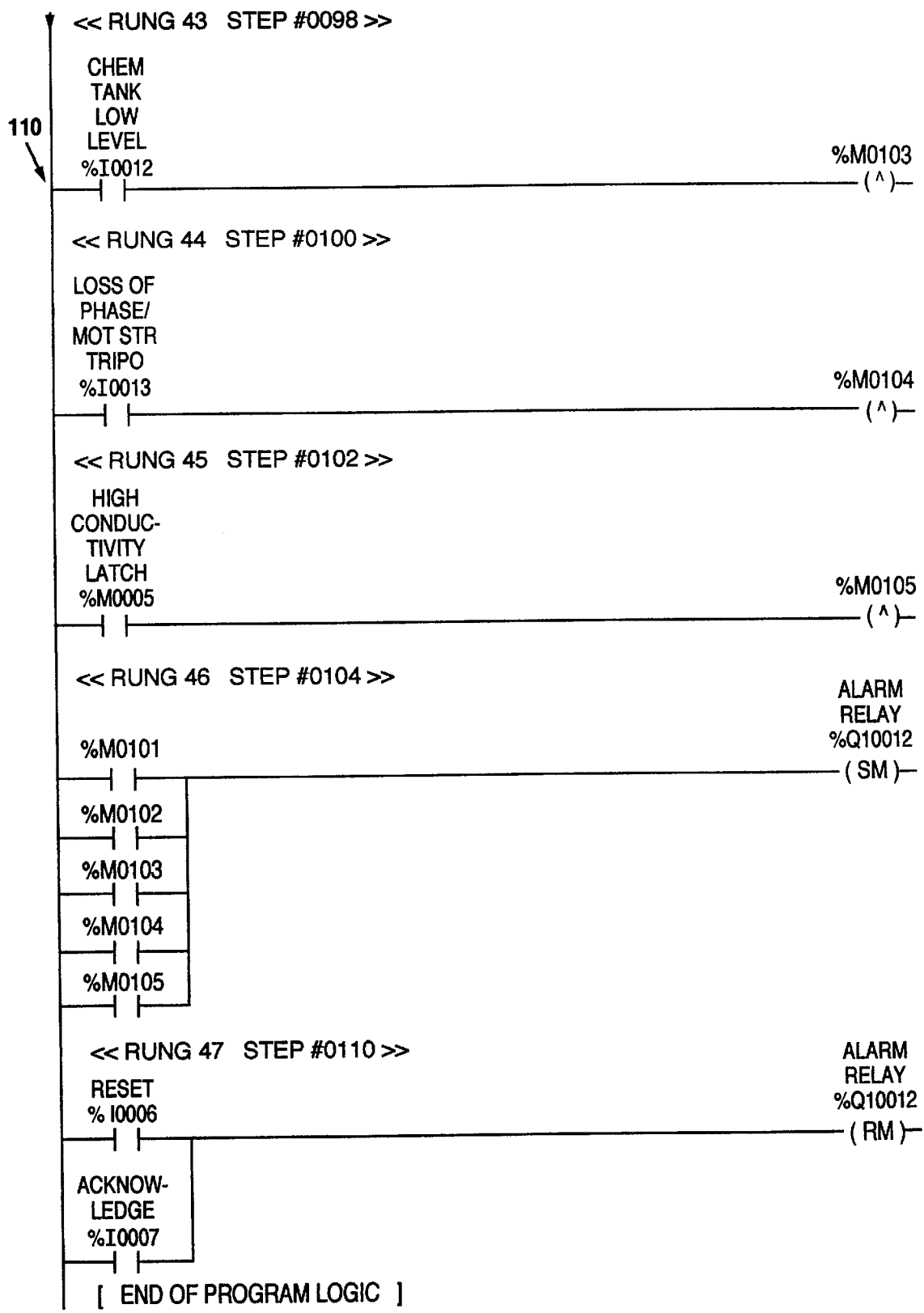

A sample PLC program documentation package is shown (FIGS. 1, 2A–2E, and 3). Such documentation is typical of what is currently generated by existing technology. The PLC example is a short program, but will suffice to illustrate the concepts involved. Following is a description of what this documentation covers:

FIG. 1 defines nicknames and service descriptions for specific entities (points or objects) used within the system. These points may represent physical signals going to or from the PLC to the system being controlled (in this case some pumps, valves, and indicator lights).

FIGS. 2A–2E show the program logic (represented in a form called "ladder logic" (since it looks a bit like rungs of a ladder).

FIG. 3 lists each point and its "cross reference" (i.e., where it is used). Using this cross reference and the program logic (ladder) the user presently has to manually determine interactions each time the need arises. Note: these are the interactions the present invention automatically determines for the user, and will be discussed further below.

When the user needs to do maintenance work on the chemical tank low level switch, this switch is connected to the PLC. This point is identified within the PLC as % I0012 (the twelfth digital input) and has the description "CHEM TANK LOW LEVEL" with a nickname of "CHTLL" (FIG. 1).

The existing manual procedure that may be used to determine what might happen to the manufacturing process while maintenance on the chemical tank low level switch is going on (i.e., what could % I0012 affect?) would take the following steps:

1. Look up % I0012 on the cross-reference chart of FIG. 3 (100) and note that % I0012 is used in rungs 22 and 43.
2. Turn to rung 22 (102) on the ladder logic FIG. 2B and see that it can affect the state of coil % M0003 (103).
3. Turn back to the cross-reference chart of FIG. 3 and find % M0003 (104) and see that it is used in rungs 22, 35 and 12 (106).

4. Go back to the ladder logic FIG. 2B, look at rung 22 (102) and see that % M0003 only affects itself in this case.
5. Next, turn to FIG. 2D to find rung 35 (108) and see that % M0003 further affects coil % Q0009 which is identified as the LO LEV CHEM TANK LAMP (110).
6. Turn back to FIG. 3 to find % Q0009 (112) and see that it is only in rung 35 (116), and is not used elsewhere.
7. Next, look at rung 12 (116) on FIG. 2A and see that % M0003 also affects % Q0005 which is identified as the CHEM PUMP OUTPUT (118).
8. Finally, the user must look up % Q0005 (120) on cross-reference chart FIG. 3 and see that it is only in rung 12 (122), and is not used elsewhere.

From this rather tedious and time-consuming method of moving back and forth between the charts, the user now knows (if he has accurately recorded the information) that when he goes to work on the CHEM TANK LOW LEVEL switch that the LO LEV CHEM TANK LAMP might go on/off and the CHEM PUMP OUTPUT might turn the pump on/off. If turning the pump on/off might disrupt the manufacturing process, the user may take steps to force the pump to remain on (or off) while this maintenance is going on.

With the method and apparatus of the present invention by analyzing the points or objects and logic, a complete reference of interactions can be generated. This reference can be printed or incorporated in a table. FIG. 4 illustrates a portion of such a table. Even on a short PLC, the table could include thousands of interactions. A computer database is the practical formal for this information, and the analyzing is done by a computer program.

This database for the table (FIG. 4) may be generated by reading in the ASCII text files generated by existing control system documentation packages, and interpreting this data with a computer program. Interactions that are not expressed within the logic of the program (e.g., interactions which take place outside the controller—such as a flow which changes when a valve closes) may be determined and included manually, or via other automated techniques. However, the method of the present invention is considerably less time-consuming and is far more accurate.

Once the reference table is created, and is data within the computer, a query of this table determines the chain of influences. For example, Point A is to be worked on and will be changing in value. The engineer needs to know what will be affected by this point value changing. A query is done to determine what A can affect. The table contains records that indicate A directly affects B, B directly affects C, C directly affects H, and H directly affects M, N and P. Therefore, the result of the query shows that A affects (directly and indirectly) B, C, H, M, N and P (and only those points). The details of the linkages from A to B, B to C, C to H, and H to M, N and P, are also provided. This information is presented in either table or graphical form FIG. 4. Additional information regarding the points may be included to aid the engineer. Block diagram FIG. 5 illustrates the method of the present invention.

Figure 6:
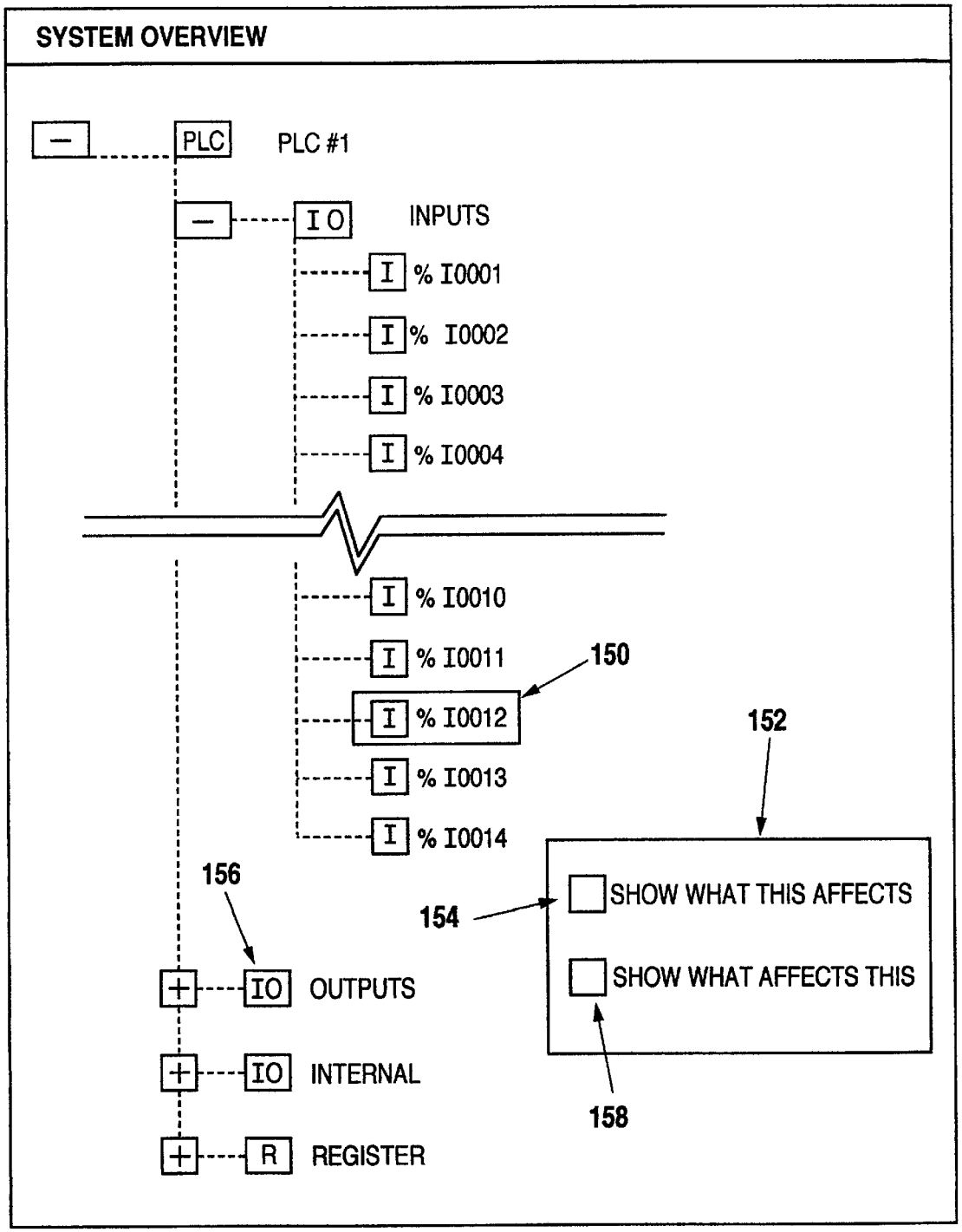
FIG. 6 illustrates an interactions selection display of the present invention.
Figure 7:
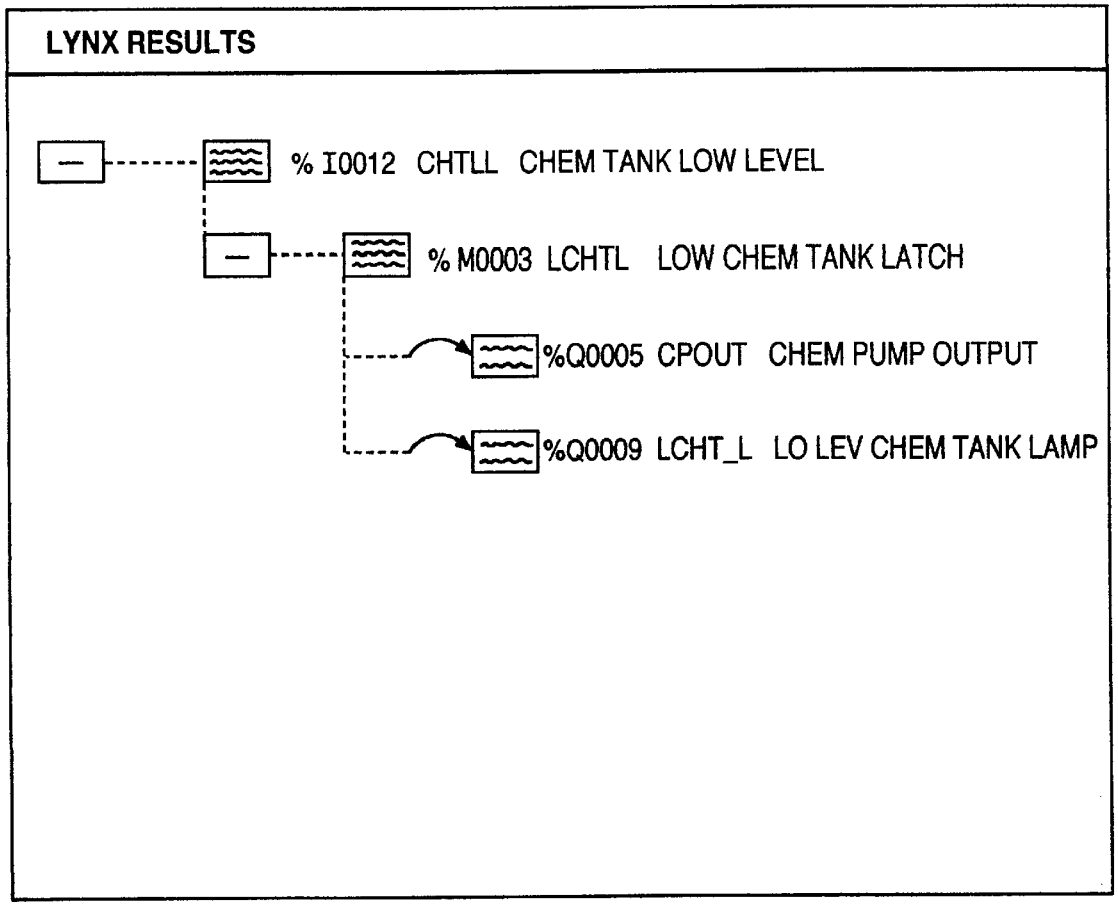
FIG. 7 illustrates a computer screen display of the present invention.

Returning to the specific example above relating to "what could % I0012 affect?", with the present invention the user would simply click a button on the computer (SYSTEMS OVERVIEW) which causes a menu of inputs, outputs, internal points to be displayed on the computer screen (FIG. 6). Under "Inputs" he clicks on the % I0012 CHTLL CHEM TANK LOW LEVEL reference point (150) from this list of all the points. On the mouse, he then right clicks and a small menu pops up (152). He clicks "Show What This Affects" (154). The software program of the present invention will then present a window on the computer screen (FIG. 7) that will show that % I0012 affects % M0003 LCHTL LOW CHEM TANK LATCH, which in turn affects the % Q0005 CPOUT CHEM PUMP OUTPUT and the % Q0009 LCHT_L LO LEV CHEM TANK LAMP. The arrow in FIG. 7 illustrates the direction of influence.

Figure 8:
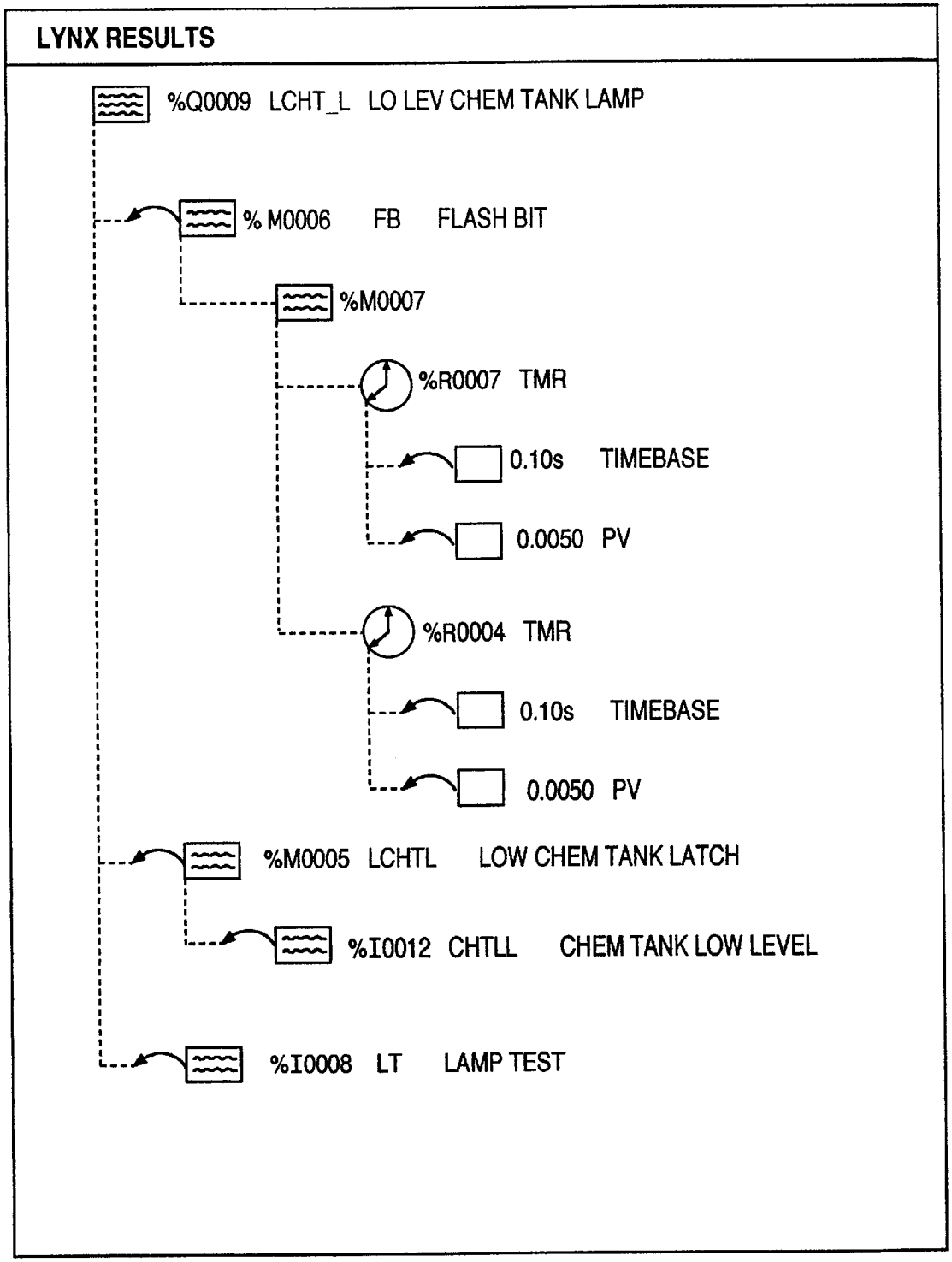
FIG. 8 illustrates a second computer screen display of the present invention.

In a somewhat similar manner, the user could select from the screen of FIG. 6 "Outputs" (156). An outputs screen similar to the inputs screen of FIG. 6 would display various outputs. The user could select Q0009. A right click would pull up the manu and the user could click on "Show What Affects This" (158). Thus, the user would be asking "what could affect %Q0009?" The software program of the present invention will then present a window on the computer screen (FIG. 8) that will show what could affect %Q0009; i.e., %M0006 FB FLASH BIT; %M0007; %R0007 TMR; $0.10_s$ TIMEBASE; 0.0050 PV; %R0004 TMR; $0.10_s$ TIMEBASE; 0.0050 PV; %M0005 LCHTL; %I0012 CHTLL; and %I008 LT LAMP TEST.

Thus, the present invention interprets the PLC documentation into information that is then loaded into the database and stores this information in another table of the database. This interaction information is then available for a number of uses, the simplest of which is simply for presentation to the user upon request.

Another use of the present invention determines all linkages for a particular input card of the PLC (a card generally has multiple points residing on it—from 4 to 64 different points). This allows the user to determine what would happen if the card were pulled out for repair. This was impractical to do with the prior art systems.

The above example is for a particular system (a programmable logic controller—PLC), but the invention is applicable to a number of different types of control systems. The invention is novel in its application to industrial control systems.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A method for identifying process interactions comprising the steps of:

identifying and inputting process data points into a computer;

preparing and inputting a logic network relating said points into said computer;

analyzing the interactions of said points through said logic network by means of a computer program operating on said computer to determine a first set of said process data points having an influence upon a second set of said process data points;

tabulating within said program only those interactions which affect selected process data points; and presenting said tabulations in a readable format on a screen of said computer as a chain of influences upon said selected process data points.

2. The method of claim 1 further comprising the steps of printing out said tabulations presented on said screen.

3. An apparatus for identifying process interactions within a system comprising:

a computer;

a means for identifying process data points within said system and inputting said identified data points into said computer;

a logic network interactively connected to said identifying means;

a means for analyzing interactions between said data points connected to said network to determine a first set of said process data points having an influence upon second set of said process data points;

a tabulator connected to said analyzing means, said tabulator tabulating only those interactions which affect selected process data points; and a display member for presenting said tabulations in a readable format on a screen of said computer as a chain of influences upon said selected process data points.

4. The method of claim 1 wherein said influence is defined within said logic network.

5. The apparatus of claim 3 wherein said influence is defined within said logic network.

* * * * *